United States Patent
Huang et al.

(10) Patent No.: US 7,936,406 B2
(45) Date of Patent: May 3, 2011

(54) METHOD AND RESULTING CAPACITOR STRUCTURE FOR LIQUID CRYSTAL ON SILICON DISPLAY DEVICES

(75) Inventors: Herb Huang, Shanghai (CN); Wei Min Li, Shanghai (CN); Haiting Li, Shanghai (CN); Ziru Ren, Shangahi (CN); Yinan Han, Shanghai (CN)

(73) Assignee: Semiconductor Manufacturing International (Shanghai) Corporation, Shanghai (CN)

( * ) Notice: Subject to any disclaimer, the term of this patent is extended or adjusted under 35 U.S.C. 154(b) by 0 days.

(21) Appl. No.: 12/259,160

(22) Filed: Oct. 27, 2008
(Under 37 CFR 1.47)

(65) Prior Publication Data
US 2010/0283926 A1    Nov. 11, 2010

(30) Foreign Application Priority Data

Jul. 3, 2008    (CN) .......................... 2008 1 0040294

(51) Int. Cl.
*G02F 1/1343* (2006.01)
*G02F 1/1333* (2006.01)
(52) U.S. Cl. ................ 349/38; 349/51; 349/52
(58) Field of Classification Search ............ 349/38, 349/51, 52
See application file for complete search history.

(56) References Cited

U.S. PATENT DOCUMENTS

| | | | | |
|---|---|---|---|---|
| 7,388,624 B2 * | 6/2008 | Chen et al. | | 349/44 |
| 7,586,552 B2 * | 9/2009 | Ishii | | 349/39 |
| 7,847,871 B2 * | 12/2010 | Yasukawa | | 349/39 |
| 2003/0143768 A1 * | 7/2003 | Chen et al. | | 438/30 |
| 2006/0050035 A1 * | 3/2006 | Leo et al. | | 345/89 |
| 2006/0243977 A1 * | 11/2006 | Yamasaki | | 257/59 |
| 2006/0286698 A1 * | 12/2006 | Kurashina | | 438/29 |
| 2007/0046885 A1 * | 3/2007 | Kim et al. | | 349/155 |
| 2007/0058100 A1 * | 3/2007 | Ishii | | 349/43 |
| 2007/0103621 A1 * | 5/2007 | Chen et al. | | 349/113 |
| 2007/0279348 A1 * | 12/2007 | Morvan et al. | | 345/87 |
| 2008/0007573 A1 * | 1/2008 | Takeuchi et al. | | 345/690 |
| 2008/0129911 A1 * | 6/2008 | Huang et al. | | 349/44 |
| 2008/0192159 A1 * | 8/2008 | Ishii | | 349/39 |
| 2008/0198284 A1 * | 8/2008 | Oyamada | | 349/39 |
| 2008/0284929 A1 * | 11/2008 | Kimura | | 349/38 |
| 2009/0051840 A1 * | 2/2009 | Yasukawa | | 349/39 |

* cited by examiner

*Primary Examiner* — Rhonda S Peace
(74) *Attorney, Agent, or Firm* — Kilpatrick Townsend and Stockton LLP

(57) ABSTRACT

In a specific embodiment, the present invention provides an LCOS device. The device has a semiconductor substrate, e.g., silicon substrate. The device has a transistor formed within the semiconductor substrate. The transistor has a first node, a second node, and a row node. A first capacitor structure is coupled to the transistor. The first capacitor structure includes a first polysilicon layer coupled to the second node of the transistor. The first capacitor structure also has a first capacitor insulating layer overlying the first polysilicon layer and a second polysilicon layer overlying the insulating layer. The second polysilicon layer is coupled to a reference potential, e.g., ground. The device has a second capacitor structure coupled to the transistor. The second capacitor structure has a first metal layer coupled to the reference potential, a second capacitor insulating layer, and a second metal layer coupled to the second node of the transistor. A pixel electrode comprises the first metal layer. The pixel electrode is coupled to the second node of the transistor. A mirror surface is on the pixel electrode. The device has a light shielding layer formed from a portion of the second metal layer.

19 Claims, 4 Drawing Sheets

METHOD AND RESULTING CAPACITOR STRUCTURE FOR LIQUID CRYSTAL ON SILICON DISPLAY DEVICES

CROSS-REFERENCE TO RELATED APPLICATIONS

This application claims priority to Chinese Application No. 200810040294.5, filed Jul. 3, 2008, commonly assigned, and incorporated herein by reference for all purposes.

BACKGROUND OF THE INVENTION

The present invention is directed to integrated circuits and their processing for the manufacture of electronic devices. More particularly, the invention provides a method for manufacturing a capacitor structure for a liquid crystal on silicon ("LCOS") device for displays. But it would be recognized that the invention has a much broader range of applicability.

Electronic display technologies have rapidly developed over the years. From the early days, cathode ray tube technology, commonly called CRTs, outputted selected pixel elements onto a glass screen in conventional television sets. These television sets originally output black and white moving pictures. Color television sets soon replaced most if not all black and white television units. Although very successful, CRTs were often bulky, difficult to make larger, and had other limitations.

CRTs were soon replaced, at least in part, with liquid crystal panel displays. These liquid crystal panel displays commonly called LCDs used an array of transistor elements coupled to a liquid crystal material and color filter to output moving pictures in color. Many computer terminals and smaller display devices often relied upon LCDs to output video, text, and other visual features. Unfortunately, liquid crystal panels often had low yields and were difficult to scale up to larger sizes. These LCDs were often unsuitable for larger displays often required for television sets and the like.

Accordingly, projection display units have been developed. These projection display units include, among others, a counterpart liquid crystal display, which outputs light from selected pixel elements through a lens to a larger display to create moving pictures, text, and other visual images. Another technology is called "Digital Light Processing" (DLP), which is a commercial name from Texas Instruments Incorporated (TI) of Texas, USA. DLP is often referred to as the use of "micro-mirrors." DLP relies upon a few hundred thousand tiny mirrors, which line up in 800 rows of 600 mirrors each. Each of the mirrors is hinged. An actuator is attached to each of the hinges. The actuator is often electrostatic energy that can tilt each of the mirrors at high frequency. The moving mirrors can modulate light, which can be transmitted through a lens and then displayed on a screen. Although DLP has been successful, it is often difficult to manufacture and subject to low yields, etc.

Yet another technique is called LCOS, which uses both mirrors and liquid crystals. LCOS uses liquid crystals applied to a reflective mirror substrate. As the liquid crystals "open" or "close," light is reflected or blocked, which modulates the light to create an image for display. Often times, there are at least three LCOS chips, each corresponding to light in red, green, and blue channels. LCOS, however, has many limitations. As merely an example, LCOS is often difficult to manufacture. Additionally, LCOS requires at least the three chips that make the projector bulky and heavy and leads to high costs. Accordingly, LCOS has not been adapted to portable projectors.

From the above, it is seen that an improved technique for processing devices is desired.

BRIEF SUMMARY OF THE INVENTION

According to the present invention, techniques for processing integrated circuits for the manufacture of electronic devices are provided. More particularly, the invention provides a method for manufacturing a capacitor structure for a liquid crystal on silicon ("LCOS") device for displays. But it would be recognized that the invention has a much broader range of applicability.

As additional background information, a conventional LCOS backplane CMOS driver usually employs at least the following components in a unit display pixel (See FIG. 1):

1) a high voltage (HV) MOS selector transistor 101, which includes a row 105, column 103, and output 107;

2) a polysilicon insulator polysilicon (PIP) capacitor, which includes electrodes 115, 112, which is coupled to ground 117 and line 111 respectively;

3) an aluminum top metal electrode 109 also as a reflector to incident light; and 4) a subsequent metal light shield to the top metal electrode (TM);

each of these components, taking one or two mask layers of photo/etch processing, operates individually for its assigned but limited functionality. Meanwhile, as the aluminum (Al) top metal becomes even thinner for better reflectivity, it is less feasible to use the top metal for bonding pads. An extra passivation etch is often required to open the bonding pads down to a thicker subsequently lower metal layer for chip bonding. To further increase the performance versus cost ratio, an improvement in the efficiency in comprehensively utilizing the limited layer stack and improving, and even maximizing the performance of an LCOS backplane driver chip is desirable. These and other limitations have been overcome, at least in part and/or whole, by embodiments of the present invention.

In a specific embodiment, the present invention provides an LCOS device. The device has a semiconductor substrate, e.g., silicon substrate. The device has a transistor formed within the semiconductor substrate. The transistor has a first node, a second node, and a row node. A first capacitor structure is coupled to the transistor. The first capacitor structure includes a first polysilicon layer coupled to the second node of the transistor. The first capacitor structure also has a first capacitor insulating layer overlying the first polysilicon layer and a second polysilicon layer overlying the insulating layer. The second polysilicon layer is coupled to a reference potential, e.g., ground. The device has a second capacitor structure coupled to the transistor. The second capacitor structure has a first metal layer coupled to the reference potential, a second capacitor insulating layer, and a second metal layer coupled to the second node of the transistor. A pixel electrode comprises the first metal layer. The pixel electrode is coupled to the second node of the transistor. A mirror surface is on the pixel electrode. The device has a light shielding layer formed from a portion of the second metal layer.

In an alternative specific embodiment, the present invention provides an alternative LCOS device. The device has a semiconductor substrate, e.g., silicon wafer. The device has a high voltage MOS transistor formed within the semiconductor substrate. Preferably, the high voltage MOS transistor has a first source/drain coupled to a first node, a second source/drain coupled to a second node, and a gate coupled to a row node. A PIP capacitor structure is coupled to the HV MOS transistor. Preferably, the PIP capacitor structure has a first polysilicon layer coupled to the second node of the HV MOS transistor, a first capacitor insulating layer overlying the first polysilicon layer, and a second polysilicon layer overlying the insulating layer. The second polysilicon layer is coupled to a reference potential, e.g., ground potential. A MIM capacitor structure is coupled to the HV MOS transistor. Preferably, the MIM capacitor structure has a first metal layer coupled to the reference potential, a second capacitor insulating layer, and a second metal layer coupled to the second node of the HV MOS transistor. A pixel electrode comprises the first metal layer. Preferably, the pixel electrode is coupled to the second node of the HV MOS transistor. A mirror surface is on the pixel electrode. A light shielding layer is formed from a portion of the second metal layer and a ground potential is coupled to the reference potential. Preferably, the HV MOS device is adapted to switch a voltage potential of about 10 volts to about 20 volts.

In yet an alternative specific embodiment, the invention provides a method for fabricating an LCOS device. The method includes providing a semiconductor substrate. The method also includes forming a transistor structure within the semiconductor substrate. The transistor structure has a first node, a second node, and a row node. The method includes forming a first capacitor structure coupled to the transistor structure. Preferably, the first capacitor structure comprises a first polysilicon layer coupled to the second node of the transistor structure, a first capacitor insulating layer overlying the first polysilicon layer, and a second polysilicon layer overlying the insulating layer. The second polysilicon layer is coupled to a reference potential. The method further includes forming a second capacitor structure coupled to the transistor structure. Preferably, the second capacitor structure comprises a first metal layer coupled to the reference potential, a second capacitor insulating layer, and a second metal layer coupled to the second node of the transistor structure. The method includes forming a pixel electrode comprising the first metal layer. Preferably, the pixel electrode is coupled to the second node of the transistor structure. The method includes forming a mirror surface on the pixel electrode and forming a light shielding layer from a portion of the second metal layer.

Many benefits are achieved by way of the present invention over conventional techniques. For example, the present technique provides an easy to use process that relies upon conventional technology. In some embodiments, the method provides higher device yields in dies per wafer. Additionally, the method provides a process that is compatible with conventional process technology without substantial modifications to conventional equipment and processes. Preferably, the invention provides for an improved capacitor structure for LCOS devices used for displays. Such capacitor structure uses multiple capacitor structures according to preferred embodiments. Certain embodiments of the present invention may include one or more of the following features:

1) The unit display pixel has a high voltage (HV) MOS select transistor with its drain electrically connected to an MIM capacitor and a PIP capacitor in parallel;
2) The MIM capacitor has a top metal (TM) pixel electrode also as a light reflector and the grounded subsequent metal light-shield, separated by a thin layer of dielectric material such as $Si_3N_4$, $SiO_2$ or $Al_2O_3$, or any combination of these and other suitable materials;
3) The PIP capacitor has a top polysilicon plate and bottom polysilicon plate, also separated by a thin layer of dielectric material such as $Si_3N_4$, $SiO_2$ or $Al_2O_3$ or in combination of these and other suitable materials; and
4) A thin but wide open via connects the TM and the subsequent metal layer at a bonding pad region to form a stacked, thicker bond pad structure, more robust than a single (either TM or subsequent metal) layer bond pad; such a via does not need W plug CVD deposition as it is much thinner than convention IMD dielctric.

Depending upon the embodiment, the present invention in comprehension would expand while integrate feasible functionality of those noted features beyond their conventional settings and thus offer a much-improved value versus cost ratio. In particular, total capacitance built through both the PIP and MIM capacitors in electrically parallel connection on a unit pixel cell could be much increased while more real estate could be relocated to a higher driving current HV MOS transistor. And not only are the TM and the subsequent metal layer utilized for the array pixels' second capacitor, MIM capacitor but also integrated as a more robust bonding pad structure. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques for processing integrated circuits for the manufacture of electronic devices are provided. More particularly, the invention provides a method for manufacturing a capacitor structure for a liquid crystal on silicon ("LCOS") device for displays. But it would be recognized that the invention has a much broader range of applicability.

Figure 1:
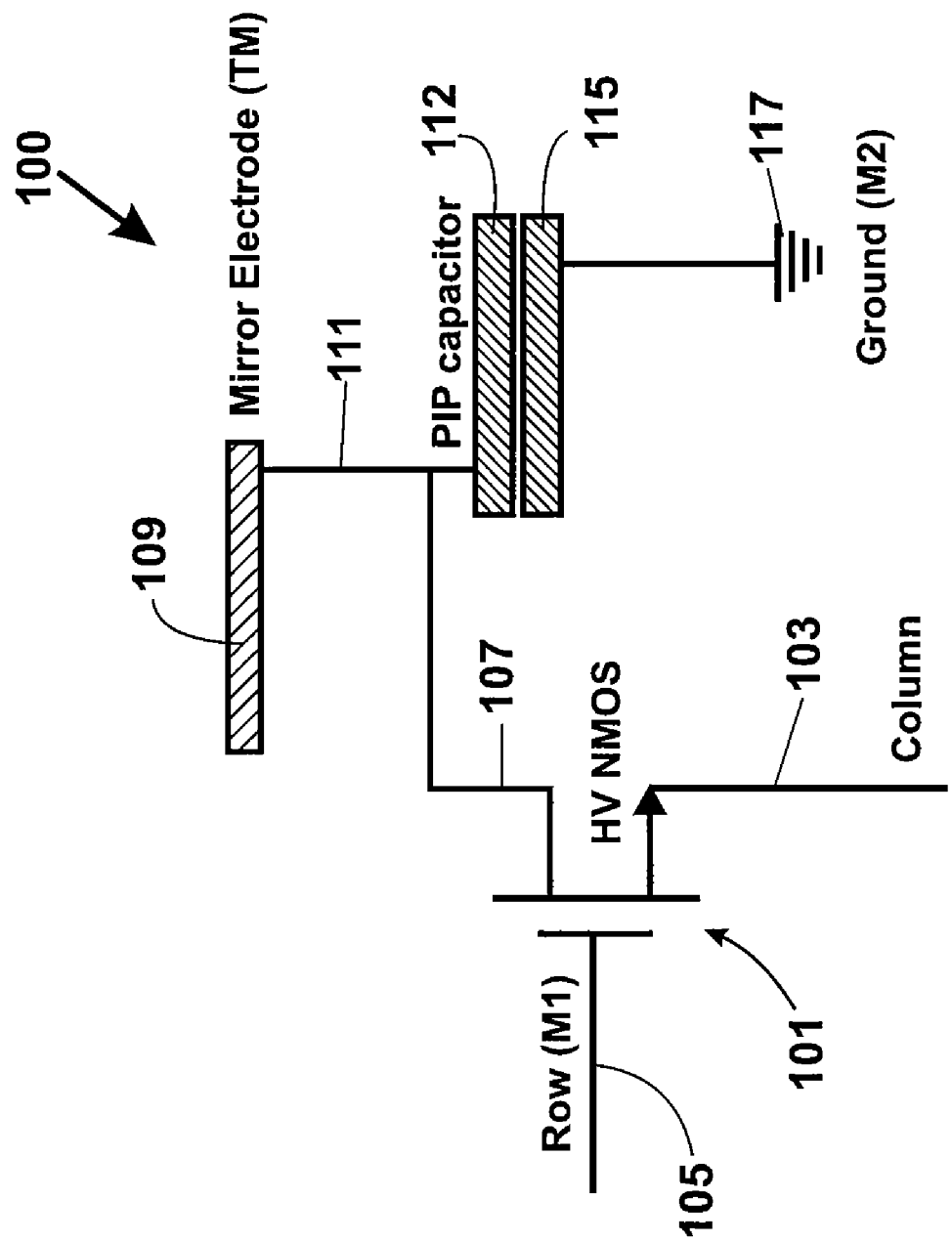
FIG. 1 is a simplified diagram of a conventional LCOS pixel cell.
Figure 2:
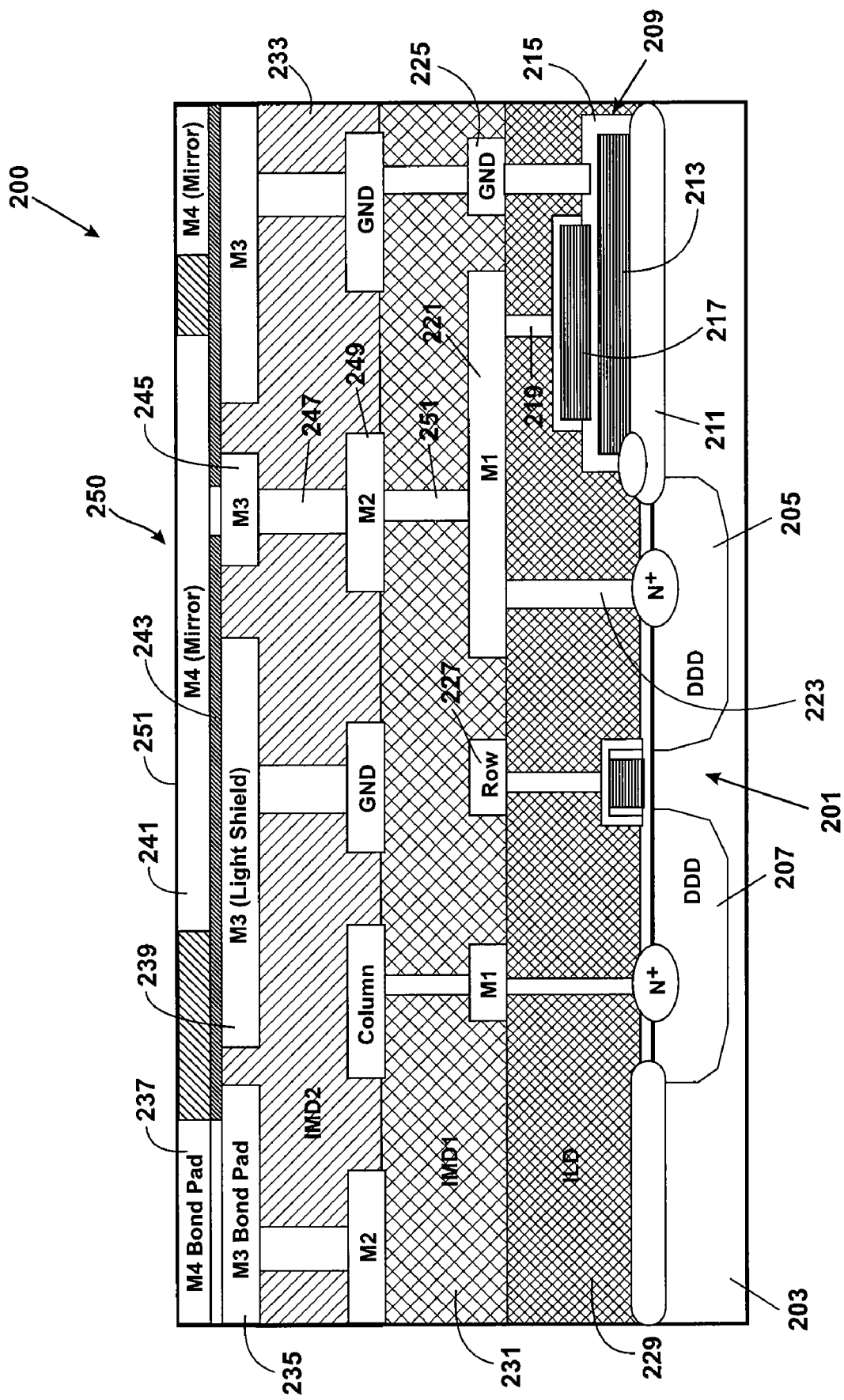
FIG. 2 is a simplified cross-sectional view diagram of an LCOS pixel cell according to an embodiment of the present invention.

FIG. 2 is a simplified cross-sectional view diagram of an LCOS pixel cell according to an embodiment of the present invention. This diagram is merely an example, which should not unduly limit the scope of the claims herein. One of ordinary skill in the art would recognize many variations, alternatives, and modifications. As shown, the present invention provides an LCOS device 200. The device has a semiconductor substrate 203, e.g., silicon wafer. The device has a high voltage MOS transistor 201 formed within the semiconductor substrate. Preferably, the high voltage MOS transistor has a first source/drain 207 coupled to a first node, a second source/drain 205 coupled to a second node, and a gate coupled to a row node 227. The source/drain regions include a double diffused drain region (DDD) and N+ type plug implant region. Preferably, the first node is coupled to metal 1 via plug, which is coupled to a column node. The device also includes interlayer dielectric layer 229, e.g., borophosphosilicate glass (BPSG), phosphosilicate glass (PSG), fluorinated silicate glass (FSG). The device also includes inter metal layer dielectric (IMD1) 231, which is overlying the metal 1 layer.

A PIP capacitor structure 209 is coupled to the HV MOS transistor. Preferably, the PIP capacitor structure has a first polysilicon layer 217 coupled to the second node 223 of the HV MOS transistor, a first capacitor insulating layer 215 overlying the first polysilicon layer, and a second polysilicon layer 213 overlying the insulating layer. The second polysilicon layer is coupled to a reference potential 225, e.g., ground potential. The second polysilicon layer is also overlying isolation region 211, which can be field isolation oxide or other suitable isolation structure. As also shown, the first polysilicon layer is connected to plug layer 219, which is coupled to metal 1 layer 221, which couples to plug layer 223, which couples to source/drain region 205. The PIP capacitor insulating layer comprises a silicon dioxide material having a thickness ranging from about 500 Angstroms to about 1500 Angstroms. The insulating layer is made of a material selected from $Si_3N_4$, $SiO_2$, or $Al_2O_3$, or any combination of these, and other suitable materials.

A MIM capacitor structure 250 is coupled to the HV MOS transistor. Preferably, the MIM capacitor structure has a first metal layer 239 coupled to the reference potential, a second capacitor insulating layer 243, and a second metal layer 241 coupled to the second node of the HV MOS transistor. The second metal layer is coupled to metal 3 245, which is coupled to plug layer 247, which is coupled to metal 2 249, which is coupled to plug layer 251, which is coupled to metal 1 221, which is coupled to plug layer 223, which is coupled to source/drain region 205 of the HV NMOS device. The capacitor insulating layer is made of a material selected from $Si_3N_4$, $SiO_2$, or $Al_2O_3$, or any combination of these, and other suitable materials.

A pixel electrode comprises the first metal layer. Preferably, the pixel electrode is coupled to the second node of the HV MOS transistor. A mirror surface 251 is on the pixel electrode. A light shielding layer 239 is formed from a portion of the second metal layer and a ground potential is coupled to the reference potential. Preferably, the HV MOS device is adapted to switch a voltage potential of about 10 volts to about 20 volts.

The device also includes bonding pad made of metal 4 237, which is overlying a portion 235 of metal 3, which is also a portion of the bonding pad. The bonding pad is coupled to a plug, which is coupled to the metal 2 layer. Of course, there can be other variations, modifications, and alternatives.

Depending upon the embodiment, there can be many variations to the above embodiment. As merely an example, the first metal layer for the MIM capacitor comprises an aluminum bearing material. The second metal layer for the MIM capacitor also comprises an aluminum bearing material. In a specific embodiment, the first metal layer has an area of bout 30 square micrometers to about 100 square micrometers. For the PIP capacitor, the first polysilicon layer comprises a doped polysilicon material and the second polysilicon layer comprises a doped polysilicon material. Additionally, the PIP capacitor has a capacitance value ranging from about 50 to 100 Fempto Farads according to a specific embodiment. The MIM capacitor has a capacitance value ranging from about 5 to 100 Fempto Farads according to a specific embodiment.

Figure 3:
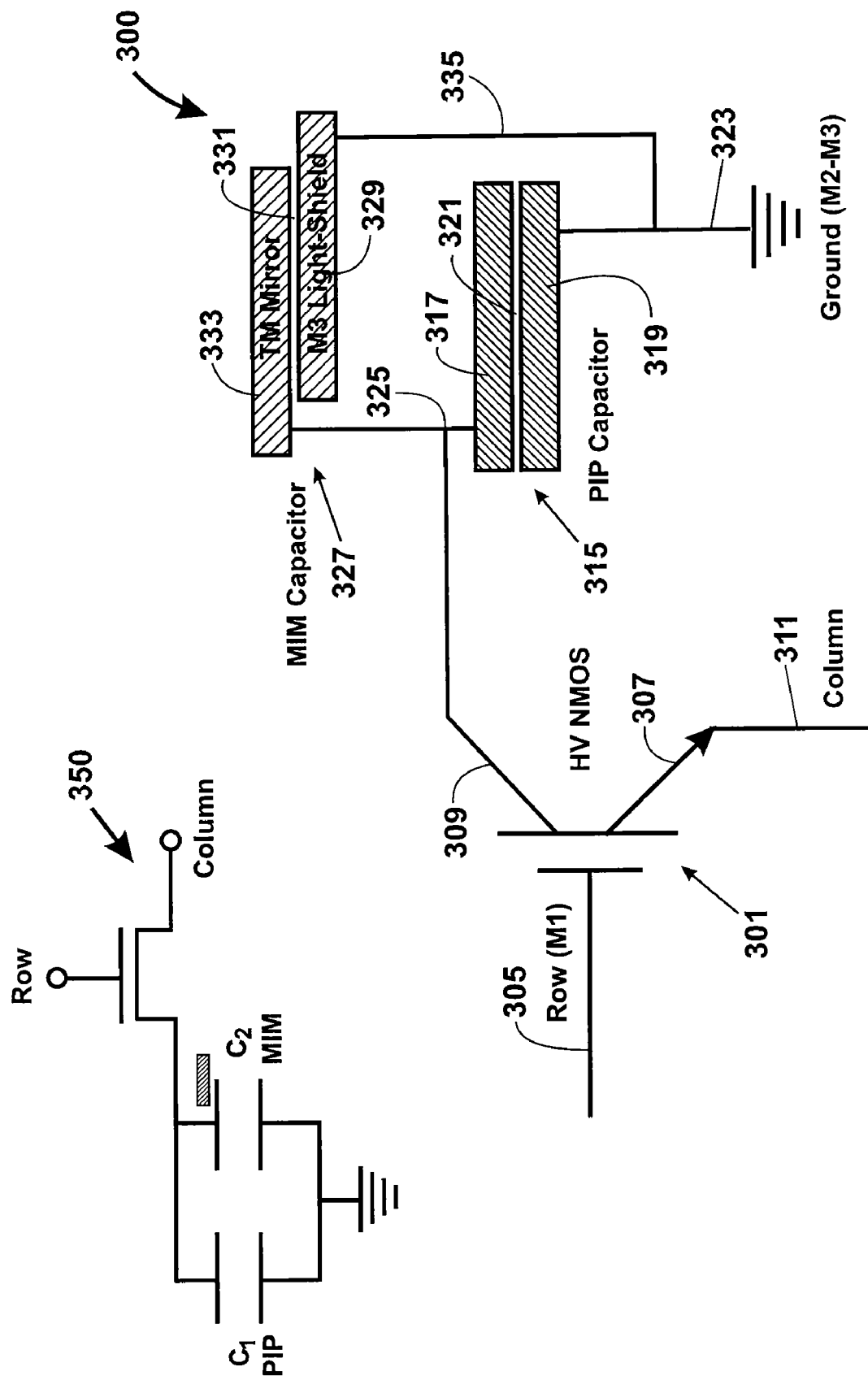
FIG. 3 is a simplified circuit diagram of an LCOS pixel cell according to an embodiment of the present invention.

Of course, one of ordinary skill in the art would recognize other variations, modifications, and alternatives. Further details of the present LCOS device can be found throughout the present specification and more particularly below. FIG. 3 is a simplified circuit diagram of an LCOS pixel cell according to an embodiment of the present invention. This diagram is merely an example, which should not unduly limit the scope of the claims herein. One of ordinary skill in the art would recognize many variations, alternatives, and modifications. As shown, the present invention provides an LCOS device. The device has a semiconductor substrate, e.g., silicon wafer. The device has a high voltage MOS transistor 301 formed within the semiconductor substrate. Preferably, the high voltage MOS transistor has a first source/drain 307 coupled to a first node 311, a second source/drain 309 coupled to a second node 325, and a gate coupled to a row node 305.

A PIP capacitor structure 315 is coupled to the HV MOS transistor. Preferably, the PIP capacitor structure has a first polysilicon layer 317 coupled to the second node of the HV MOS transistor, the first polysilicon layer overlies a first capacitor insulating layer 321, and the first capacitor insulating layer overlies a second polysilicon layer 319. The second polysilicon layer is coupled to a reference potential 323, e.g., ground potential.

A MIM capacitor structure 327 is coupled to the HV MOS transistor. Preferably, the MIM capacitor structure has a first metal layer 329 coupled to the reference potential 335, a second capacitor insulating layer 331, and a second metal layer 333 coupled to the second node 325 of the HV MOS transistor. Preferably, the PIP capacitor structure and the MIM capacitor structure are adapted to hold a charge value associated with maintaining a predetermined voltage potential on the pixel electrode.

A pixel electrode comprises the first metal layer. Preferably, the pixel electrode is coupled to the second node of the HV MOS transistor. A mirror surface is on the pixel electrode. A light shielding layer 329 is formed from a portion of the second metal layer and a ground potential is coupled to the reference potential. Preferably, the HV MOS device is adapted to switch a voltage potential of about 10 volts to about 20 volts. A circuit representation 350 is also illustrated. As shown, the PIP and MIM capacitor structures are connected in parallel to each other according to a specific embodiment.

Figure 4:
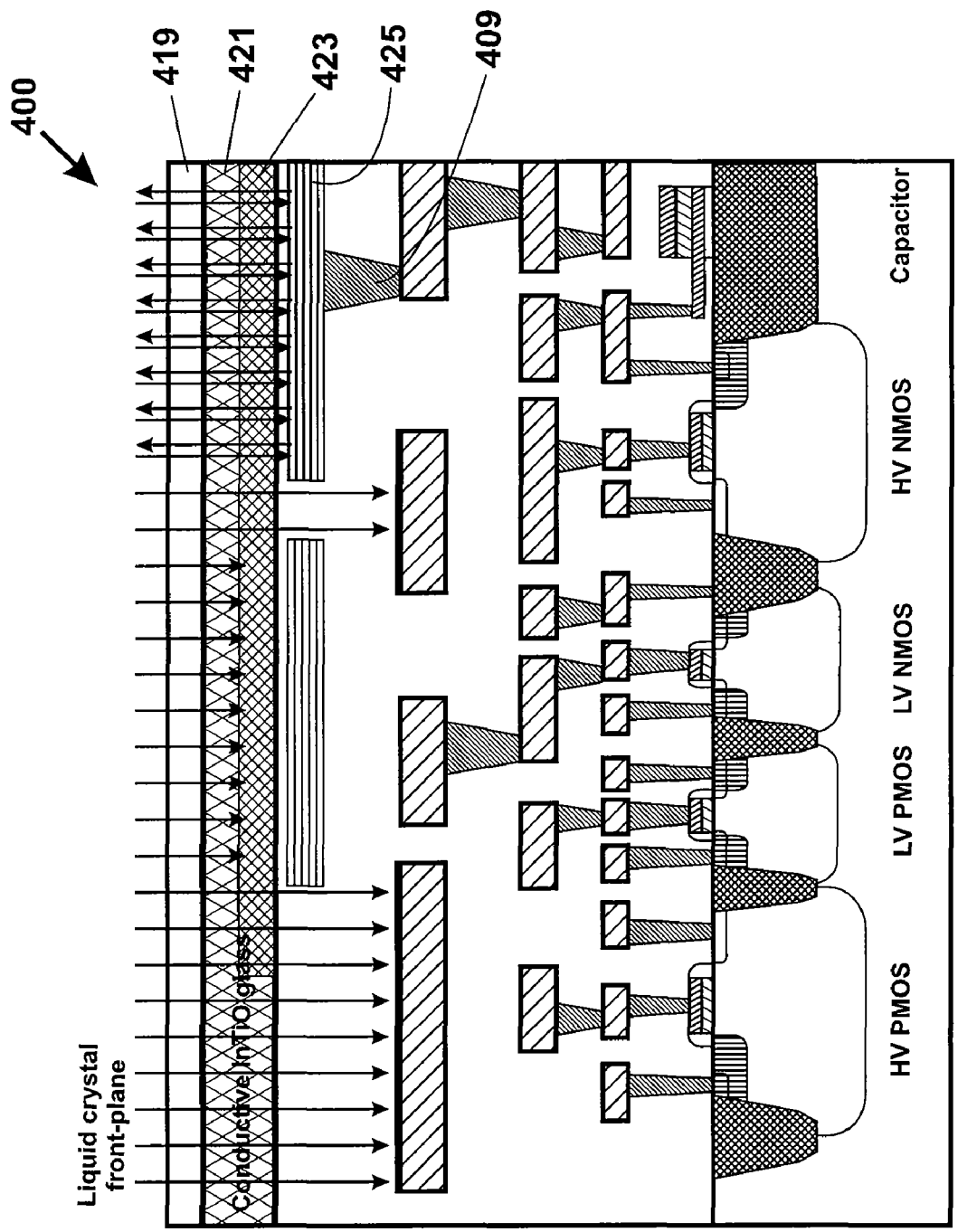
FIG. 4 is a simplified cross-sectional view diagram of an LCOS pixel device according to an embodiment of the present invention.

FIG. 4 is a simplified cross-sectional view diagram of an LCOS pixel device 400 according to an embodiment of the present invention. This diagram is merely an example, which should not unduly limit the scope of the claims herein. One of ordinary skill in the art would recognize many variations, alternatives, and modifications. As shown, the LCOS device has a semiconductor substrate, e.g., silicon wafer. An MOS device layer is formed overlying the semiconductor substrate. Preferably, the MOS device layer has a plurality of MOS devices. Each of the MOS devices has a contact region for an electrode and a contact region for a voltage potential. A planarized interlayer dielectric layer is formed overlying the MOS device layer. The LCOS device also has a plurality of recessed regions (e.g., damascene structures) within a portion of the interlayer dielectric layer and a metal layer (e.g., aluminum) to fill each of the recessed regions to form respective plurality of electrode regions 425 corresponding to each of the recessed regions. Preferably, the metal layer has been plated into each of the damascene structures. Each of the electrode regions is respectively coupled to at least one of the MOS devices among the plurality of MOS devices via interconnect structure 409, which may be a plug or other like structure. A protective layer is formed overlying surface regions of each of the plurality of electrode regions to protect the surface regions. A mirror finish is on each of the surface regions. Preferably, the mirror finish is substantially free from dishes and scratches from a chemical mechanical polishing process. Each of the electrodes may have a thickness ranging from about 2000 Angstroms to about 4000 Angstroms and can be at other dimensions. Each of the electrodes represents a pixel element in an array of pixel elements for the LCOS device. Also shown are liquid crystal film 423 overlying the electrodes. The LCOS device also has a transparent electrode layer 421 (e.g., indium tin oxide) and an overlying glass plate 419 to enclose the multilayered structure. Details on ways of operating the LCOS device can be found throughout the present specification and more particularly below.

To operate the LCOS device, light traverses through the glass cover, through the transparent electrode, and to the liquid crystal film. When the electrode is not biased, the liquid crystal film is essentially in the off position, which does not allow the light to pass therethrough. Rather, light is blocked and does not reflect off of the mirror surface of the electrode. When the electrode is biased via MOS device, the liquid crystal film is in an on-position, which allows light to pass. The light reflects off of the surface of the electrode and through the liquid crystal film, which is in an on-position. Preferably, the mirror surface is substantially free from imperfections. Accordingly, at least 93% of the incoming light passes out of the LCOS device. Details on ways of fabricating the LCOS device can be found throughout the present specification and more particularly below.

A method for fabricating an electrode structure for an LCOS device according to an embodiment of the present invention may be outlined as follows:

1. Provide a semiconductor substrate;
2. Form a transistor structure within the semiconductor substrate, where the transistor structure has a first node, a second node, and a row node;
3. Form a first capacitor structure coupled to the transistor structure, where the first capacitor structure comprises a first polysilicon layer coupled to the second node of the transistor structure, a first capacitor insulating layer overlying the first polysilicon layer, and a second polysilicon layer overlying the insulating layer;
4. Form a second capacitor structure coupled to the transistor structure, where the second capacitor structure comprises a first metal layer coupled to the reference potential, a second capacitor insulating layer, and a second metal layer coupled to the second node of the transistor structure;
5. Form a pixel electrode comprising the first metal layer;
6. Form a mirror surface on the pixel electrode;
7. Form a light shielding layer from a portion of the second metal layer;
8. Provide a liquid crystal layer overlying the pixel electrode, a transparent electrode layer overlying the liquid crystal layer, and a glass layer overlying the transparent electrode layer to form the LCOS device; and
9. Perform other steps, as desired.

The above sequence of steps provides a method according to an embodiment of the present invention. As shown, the method uses a combination of steps including a way of forming a plurality of capacitor structures for an LCOS device. Other alternatives can also be provided where steps are added, one or more steps are removed, or one or more steps are provided in a different sequence without departing from the scope of the claims herein.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An LCOS device comprising:
   a semiconductor substrate;
   a transistor formed within the semiconductor substrate, the transistor having a first node, a second node, and a row node;
   a first capacitor structure coupled to the transistor, the first capacitor structure comprising:
   a first polysilicon layer coupled to the second node of the transistor;
   a first capacitor insulating layer overlying the first polysilicon layer;
   a second polysilicon layer overlying the insulating layer, the second polysilicon layer being coupled to a reference potential;
   a second capacitor structure coupled to the transistor, the second capacitor structure comprising:
   a first metal layer coupled to the reference potential;
   a second capacitor insulating layer;
   a second metal layer coupled to the second node of the transistor;
   a pixel electrode comprising the first metal layer, the pixel electrode being coupled to the second node of the transistor;
   a mirror surface on the pixel electrode; and
   a light shielding layer formed from a portion of the second metal layer.

2. The device of claim 1 wherein the reference potential is ground.

3. The device of claim 1 wherein the first metal layer comprises an aluminum bearing material.

4. The device of claim 1 wherein the second metal layer comprises an aluminum bearing material.

5. The device of claim 1 wherein the first polysilicon layer comprises a doped polysilicon material.

6. The device of claim 1 wherein the second polysilicon layer comprises a doped polysilicon material.

7. The device of claim 1 wherein the first metal layer has an area of bout 30 square micrometers to about 100 square micrometers.

8. The device of claim 1 wherein the second capacitor is a PIP capacitor having a capacitance value ranging from about 50 to 100 Fempto Farads.

9. The device of claim 1 wherein the first capacitor is a MIM capacitor having a capacitance value ranging from about 5 to 100 Fempto Farads.

10. The device of claim 1 wherein the second capacitor insulating layer comprises a silicon dioxide material having a thickness ranging from about 500 Angstroms to about 1500 Angstroms.

11. The device of claim 1 wherein the transistor is a high voltage NMOS device adapted to switch a voltage of about 10 volts to about 20 volts.

12. The device of claim 1 wherein the first capacitor and the second capacitor are connected to each other in parallel.

13. The device of claim 1 wherein the second capacitor insulating layer is made of a material selected from $Si_3N_4$, $SiO_2$, or $Al_2O_3$.

14. The device of claim 1 wherein the first capacitor insulating layer is made of a material selected from $Si_3N_4$, $SiO_2$, or $Al_2O_3$.

15. An LCOS device comprising:
   a semiconductor substrate;
   a high voltage MOS transistor formed within the semiconductor substrate, the high voltage MOS transistor having a first source/drain coupled to a first node, a second source/drain coupled to a second node, and a gate coupled to a row node;
   a PIP capacitor structure coupled to the HV MOS transistor, the PIP capacitor structure comprising:
   a first polysilicon layer coupled to the second node of the HV MOS transistor;
   a first capacitor insulating layer overlying the first polysilicon layer;

a second polysilicon layer overlying the insulating layer, the second polysilicon layer being coupled to a reference potential;
a MIM capacitor structure coupled to the HV MOS transistor, the MIM capacitor structure comprising:
a first metal layer coupled to the reference potential;
a second capacitor insulating layer;
a second metal layer coupled to the second node of the HV MOS transistor;
a pixel electrode comprising the first metal layer, the pixel electrode being coupled to the second node of the HV MOS transistor;
a mirror surface on the pixel electrode;
a light shielding layer formed from a portion of the second metal layer;
a ground potential coupled to the reference potential.

16. The device of claim 15 wherein the HV MOS device is adapted to switch a voltage potential of about 10 volts to about 20 volts.

17. The device of claim 15 wherein the PIP capacitor is connected to the MIM capacitor in parallel configuration.

18. The device of claim 15 wherein the PIP capacitor structure and the MIM capacitor structure are adapted to hold a charge value associated with maintaining a predetermined voltage potential on the pixel electrode.

19. A method for fabricating an LCOS device, the method comprising:

providing a semiconductor substrate;
forming a transistor structure within the semiconductor substrate, the transistor structure having a first node, a second node, and a row node;
forming a first capacitor structure coupled to the transistor structure, the first capacitor structure comprising:
a first polysilicon layer coupled to the second node of the transistor structure;
a first capacitor insulating layer overlying the first polysilicon layer;
a second polysilicon layer overlying the insulating layer, the second polysilicon layer being coupled to a reference potential;
forming a second capacitor structure coupled to the transistor structure, the second capacitor structure comprising:
a first metal layer coupled to the reference potential;
a second capacitor insulating layer;
a second metal layer coupled to the second node of the transistor structure;
forming a pixel electrode comprising the first metal layer, the pixel electrode being coupled to the second node of the transistor structure;
forming a mirror surface on the pixel electrode; and
forming a light shielding layer from a portion of the second metal layer.

\* \* \* \* \*